(12) United States Patent
Dygas et al.

(10) Patent No.: US 9,613,113 B2
(45) Date of Patent: Apr. 4, 2017

(54) PARALLEL BOOTSTRAP AGGREGATING IN A DATA WAREHOUSE APPLIANCE

(71) Applicant: International Business Machines Corporation, Armonk, NY (US)

(72) Inventors: Sylwester A. Dygas, Warsaw (PL); Michal T. Iwanowski, Lodz (PL); Piotr Plonski, Lapy (PL); Mariusz Rokicki, Marki (PL)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 14/230,671

(22) Filed: Mar. 31, 2014

(65) Prior Publication Data

US 2015/0278332 A1 Oct. 1, 2015

(51) Int. Cl.
G06F 7/00 (2006.01)
G06F 17/30 (2006.01)

(52) U.S. Cl.
CPC .. G06F 17/30563 (2013.01); G06F 17/30292 (2013.01); G06F 17/30592 (2013.01)

(58) Field of Classification Search
CPC ............... G06F 19/3437; G06F 17/18; G06F 17/30292; G06F 17/3053; G06F 17/30563; G06F 8/443; G06F 17/30707; G06F 17/30917; G06F 17/30961; G06F 19/12
See application file for complete search history.

(56) References Cited

U.S. PATENT DOCUMENTS

| 6,349,291 | B1* | 2/2002 | Varma ................... G06Q 40/00 705/35 |
| 6,748,389 | B1* | 6/2004 | Cesare .............. G06F 17/30569 707/809 |
| 7,089,448 | B2 | 8/2006 | Hinshaw et al. |
| 7,543,006 | B2 | 6/2009 | Brown et al. |
| 2003/0126144 | A1* | 7/2003 | O'Halloran ....... G06F 17/30398 |
| 2004/0249904 | A1* | 12/2004 | Moore .................... H04L 29/06 709/216 |
| 2006/0288045 | A1* | 12/2006 | Raz .................... G06F 17/30595 |
| 2007/0033354 | A1* | 2/2007 | Burrows ........... G06F 17/30212 711/156 |

(Continued)

FOREIGN PATENT DOCUMENTS

| CN | 102291392 A | 12/2011 | |
| WO | WO 2007001636 A2 * | 1/2007 | ....... G06F 17/30722 |
| WO | 2012103625 A1 | 8/2012 | |

OTHER PUBLICATIONS

Introduction to Monte Carlo simulation, Raychaudhuri S., Proceeding of the 2008 Winter Simulation Conference, 2008.*

(Continued)

*Primary Examiner* — Augustine K Obisesan
(74) *Attorney, Agent, or Firm* — Scott S. Dobson

(57) ABSTRACT

A method of bootstrap sampling a dataset is described. With a process node, a series of random integers is generated. An assignment map is created. The assignment map includes a row identifier for each row of data of the dataset. A plurality of bootstrap sample identifiers defined by the series are assigned to at least one row identifier. An output table created from the assignment map. Rows of the output table include each instance of the bootstrap sample identifiers, the row identifier assigned with the bootstrap sample identifier, and data of the row.

17 Claims, 7 Drawing Sheets

(56) References Cited

U.S. PATENT DOCUMENTS

| | | |
|---|---|---|
| 2010/0223213 A1 | 9/2010 | Su et al. |
| 2011/0184934 A1* | 7/2011 | Lakshminarayan .... H03M 7/30 707/718 |
| 2012/0117008 A1 | 5/2012 | Xu et al. |
| 2012/0198322 A1* | 8/2012 | Gulwani ............... G06F 17/246 715/217 |
| 2012/0310874 A1 | 12/2012 | Dantressangle et al. |

OTHER PUBLICATIONS

Statistical SAR data characterization by bootstrapping, Belhadj et al., Proceedings of Geoscience and remote sensing symposium, pp. 1152-1154, 1999.*

A procedure for generating bootstrap samples for the validation of nonlinear mixed-effects population models, Parke et al., Computer methods and programs in biomedicine,pp. 19-29, 1999.*

A scalable bootstrap for massive data, Kleiner et al., Jun. 29, 2012.*

Dygas et al., "Parallel Bootstrap Aggregating in a Data Warehouse Appliance", U.S. Appl. No. 14/524,531, filed Oct. 27, 2014.

Govindarajan, M., "Parallel Ensemble Techniques for Data Mining Application", International Journal of Computer Science and Business Informatics, Sep. 2013, pp. 1-17, vol. 5, No. 1. http://www.ijcsbi.org/index.php/ijcsbi/article/view/122.

Kearney, M., "Press the answer button", IBM Developer Works, Technical Library, Aug. 1, 2011, (originally published in IBM Data magazines). http://www.ibm.com/developerworks/data/library/dm-mag/DMMag_2011_Issue3/Warehouse/index.html.

Kleiner et al., "The Big Data Bootstrap", Proceedings of the 29th International Conference on Machine Learning (ICML), Edinburgh, Scotland, UK, 2012, Copyright 2012 by the authors. http://www.cs.berkeley.edu/~ameet/blb_icml2012_final.pdf.

Laserson, U., "How-to: Resample from a Large Data Set in Parallel (with R on Hadoop)", Cloudera.com, blog post, first posted Feb. 25, 2013, (updated Apr. 8, 2013 and Apr. 24, 2013), © 2013 Cloudera, Inc. http://blog.cloudera.com/blog/2013/02/how-to-resample-from-a-large-data-set-in-parallel-with-r-on-hadoop/.

"Resample Data Set in Parallel with R on Hadoop", Data Science and Business Analytics, Meetup.com, Edited by Michael Walker, Mar. 3, 2013. http://www.meetup.com/Data-Science-Business-Analytics/pages/Resample_Data_Set_in_Parallel_with_R_on_Hadoop/.

Skillicorn, D.B., "Parallel Predictor Generation", Large-Scale Parallel Data Mining, Lecture Notes in Computer Science; vol. 1759: Lecture notes in artifical intelligence, pp. 190-196, 2002, vol. Eds: M.J. Zaki, C.T. H, © Springer-Verlag Heidelberg 2000, ISBN 3-540-67194-3 http://bioserver.cpgei.ct.utfpr.edu.br/disciplinas/eecp/arquivos/Zaki2000.pdf#page=198.

Yu et al., "Parallelizing Boosting and Bragging", External Technical Report (ISSN-0836-0227-2001-442), Department of Computing and Information Science, Queen's University, Kingston, Cananda, Feb. 2001, pp. 0-22, Copyright © 2001 C. Yu and D.B. Skillicorn. http://techreports.cs.queensu.ca/files/2001-442.pdf.

* cited by examiner

PARALLEL BOOTSTRAP AGGREGATING IN A DATA WAREHOUSE APPLIANCE

BACKGROUND

The present disclosure relates to data warehousing, and more specifically, to bootstrap aggregating in a data warehouse appliance.

Today, large data sets of digital information are ubiquitous among various organizations. Some organizations include government, scientific organizations, and private enterprises. These organizations may obtain petabytes of data in a single dataset. The larger the datasets get, the more difficult it is for the owners of the data sets to manage and gain useful information from a particular dataset. Different systems and data analytic algorithms have been developed to extract useful information from large datasets.

SUMMARY

According to embodiments of the present disclosure a method of bootstrap sampling a dataset, a process node performing the method and a computer program product of the method is described. With the process node, a series of random integers is generated. An assignment map is created. The assignment map includes a row identifier for each row of data of the dataset. A plurality of bootstrap sample identifiers defined by the series are assigned to at least one row identifier. An output table created from the assignment map. Rows of the output table include each instance of the bootstrap sample identifiers, the row identifier assigned with the bootstrap sample identifier, and data of the row.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

DETAILED DESCRIPTION

Aspects of the present disclosure relate to data warehousing, and more specifically, to bootstrap aggregating in a data warehouse appliance. Various embodiments relate to a data warehouse appliance and method of creating bootstrap samples of a dataset when performing data analytics in parallel. The bootstrap samples are determined by creating an assignment map based on a random series of integers. The assignment map includes a row identifier of the dataset and a bootstrap sample identifier. A single scan is performed of the assignment map to create an output table that is based on the bootstrap sample identifier. Each process node that performs parallel operations with other process nodes processes the rows of the dataset defined by a bootstrap sample identifier.

Bagging, also referred to as bootstrap aggregating, is a meta-algorithm used in machine-learning and knowledge discovery. Bagging uses resampling to create a group of additional datasets based on an initial dataset. The additional datasets are referred to as bootstrap samples. The bootstrap samples may be used in parallel for data analytic tasks which increases speed of the analysis. The bootstrap samples may be used to train a group of classification or regression models. The results obtained by combining the results of individual models ran in parallel is often less time and resource consuming and often more accurate to the results of one model trained on the whole initial dataset.

In order to obtain the bootstrap samples, a number of random samples with replacement need to be drawn from the original dataset. The term "with replacement" may mean that an element sampled may be sampled more than once. The common approach to create the bootstrap sample is to sequentially scan the initial dataset for each bootstrap sample of a desired size. This may require multiple scans and multiple distributions of the bootstrap samples that consume time and processing resources. Embodiments herein provide for a bootstrap aggregating method and system that may require a single scan of the initial dataset when creating a bootstrap sample and also less distribution of the bootstrap samples.

Figure 1:
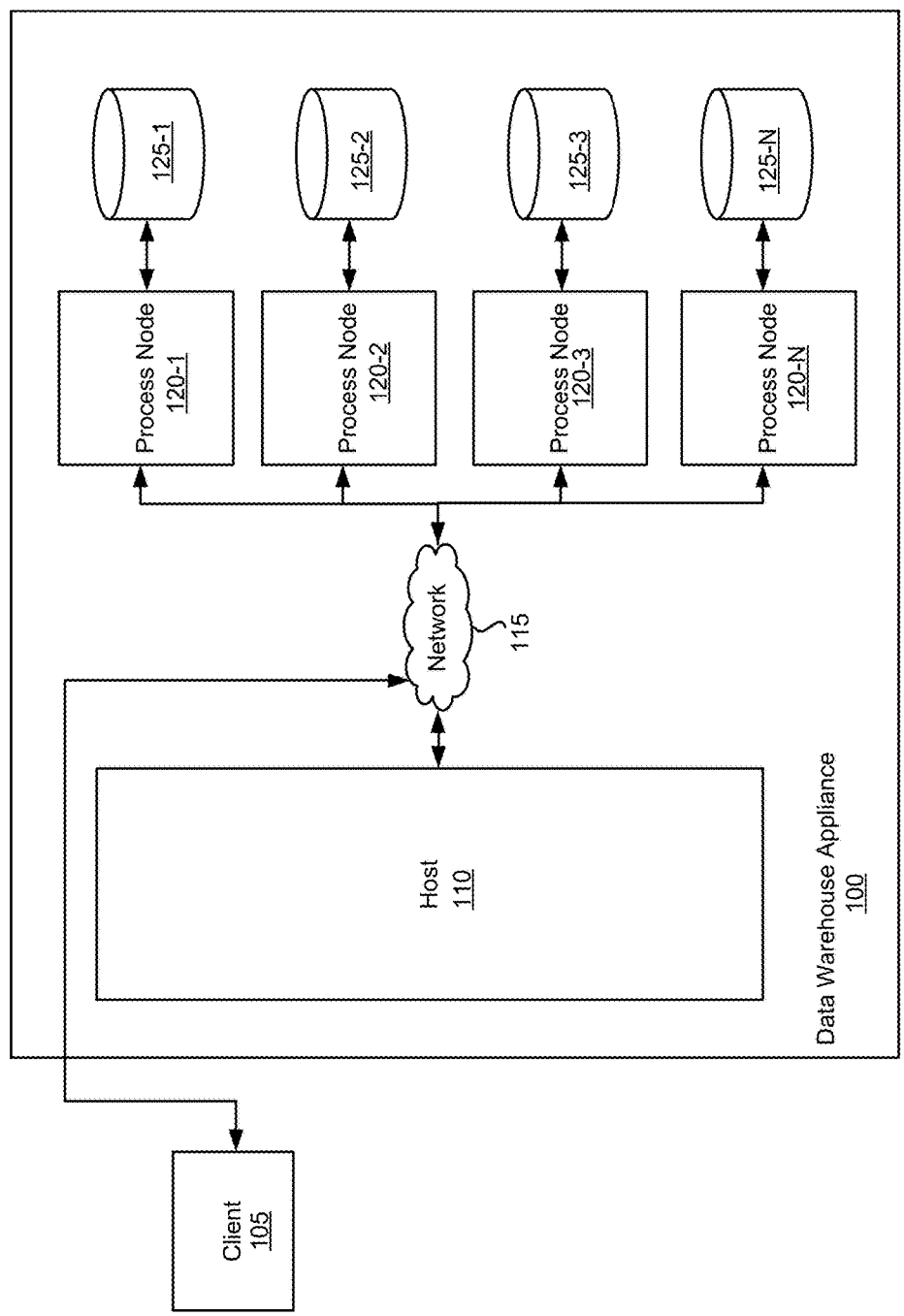
FIG. 1 illustrates an example of a data warehouse appliance that performs bootstrap aggregating and an attached client computer system, according to various embodiments.

FIG. 1 illustrates an example of a data warehouse appliance 100 that performs the bootstrap aggregating method and an attached client computer system 105, according to various embodiments. The data warehouse appliance 100 may include one or more host servers 110, a plurality of process nodes 120-1-120-N, and a plurality of storage modules 125-1-125-N. The process nodes 120-1-120-N may collectively be referred to as process nodes 120 and the storage modules 125-1-125-N may be collectively referred to as storage modules 125. The process nodes 120 may be communicatively coupled with the host 110, a client computer 105, and each other over a network 115. Each process node 120 may be communicatively coupled with one or more storage modules 125.

Each data warehouse appliance 100 may contain one or more host servers 110 that run applications of the data warehouse appliance 100. If the data warehouse appliance 100 has more than one host server 110, then one host server 110 may be the active or primary host while the other is a standby host ready to take over if the active host fails.

The process nodes 120 may provide the central processing units (CPU), and memory for the data warehouse appliance 100. Each processor may have multiple CPUs. Each process node 120 may be in communication with one or more storage modules 125. The storage modules 125 are the storage media for the user datasets such as databases and tables that are managed by the data warehouse appliance 100. The storage modules 125 may be magnetic disk drives and solid state drives for example. Each dataset may be partitioned over multiple storage modules 125. A dataset may be partitioned evenly over all of the storage modules 125. Each of these partitions may be referred to as a data slice. A process node 120 may be assigned to each data slice. Having multiple data slices processed by multiple nodes 120 may process parts of the dataset in parallel, which may decrease processing time.

As stated, the dataset may be very large and partitioned over multiple storage modules 125. To obtain bootstrap samples, the process nodes 120 may receive a random seed from the host server 110. The process nodes 120 may use the random seed to create a random series of integers that is the same series across all process nodes 120. Each process node may then create an assignment map from the random series of integers. The assignment map may list each row identifier of the dataset and may be assigned to one or more bootstrap identifiers and in some cases no bootstrap identifiers. The assignment of the bootstrap identifiers are determined by the random series of integers. Since the random series of integers is the same for each process node, the assignment map will be the same for each process node 120. Thus, there is no need to distribute the assignment map. Each process node 120 may do a single scan of the assignment map with a user defined table function which will create an output table based off of the bootstrap sample identifiers the row identifier and row data associated with each row identifier. The output table may be distributed to the storage modules 125. Each row of data assigned to a bootstrap sample identifier may be processed by the process node 120 that is assigned the bootstrap sample identifier.

Figure 2:
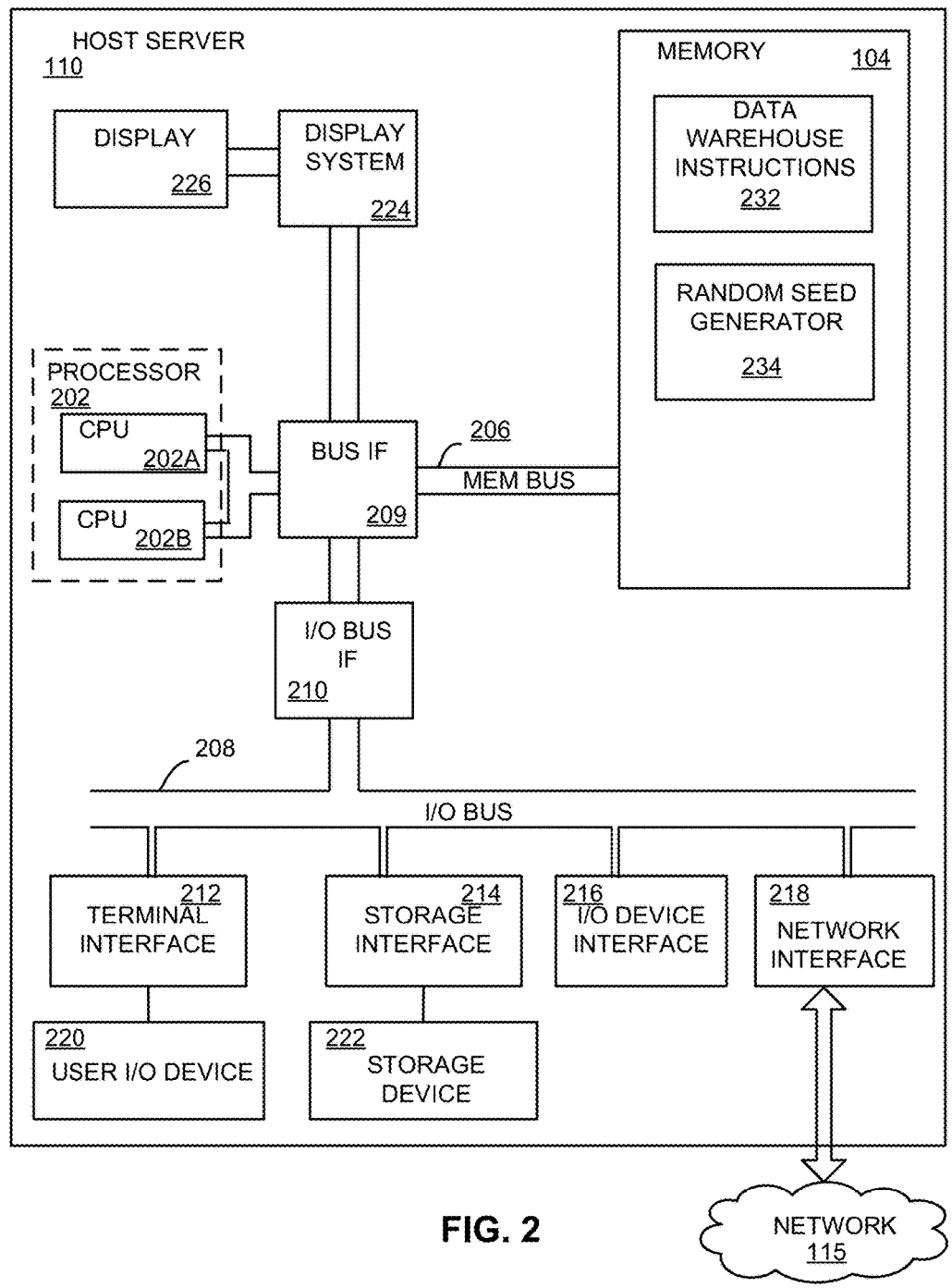
FIG. 2 is a schematic block diagram illustrating various embodiments of the host server or FIG. 1

FIG. 2 is a schematic block diagram illustrating various embodiments of the host server 110. The host server 110 is one example context in which embodiments may be implemented. The mechanisms and apparatus of the various embodiments disclosed herein apply equally to any appropriate computing system. The major components of the host server 110 include one or more processors 202, a memory 204, a terminal interface 212, a storage interface 214, an Input/Output ("I/O") device interface 216, and a network interface 218, all of which are communicatively coupled, directly or indirectly, for inter-component communication via a memory bus 206, an I/O bus 208, bus interface unit ("IF") 209, and an I/O bus interface unit 210.

The host server 110 may contain one or more general-purpose programmable central processing units (CPUs) 202A and 202B, herein generically referred to as the processor 202. In an embodiment, the host server 110 may contain multiple processors; however, in another embodiment, the host server 110 may alternatively be a single CPU system. Each processor 202 executes instructions stored in the memory 204 and may include one or more levels of on-board cache.

In an embodiment, the memory 204 may include a random-access semiconductor memory, storage device, or storage medium (either volatile or non-volatile) for storing or encoding data and programs. In another embodiment, the memory 204 represents the entire virtual memory of the host server 110, and may also include the virtual memory of other computer systems coupled to the host server 110 or connected via a network 115. The memory 204 is conceptually a single monolithic entity, but in other embodiments the memory 204 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 204 may store all or a portion of the following: data warehouse instructions 232 and a random seed generator 234. These programs and data structures are illustrated as being included within the memory 204 in the host server 110, however, in other embodiments, some or all of them may be on different computer systems and may be accessed remotely, e.g., via a network 115. The host server 110 may use virtual addressing mechanisms that allow the programs of the host server 110 to behave as if they only have access to a large, single storage entity instead of access to multiple, smaller storage entities. Thus, while data warehouse instructions 232 and a random seed generator 234 are illustrated as being included within the memory 204, they may not necessarily all be completely contained in the same storage device at the same time.

In an embodiment, data warehouse instructions 232 and a random seed generator 234 may include instructions or statements that execute on the processor 202 or instructions or statements that are interpreted by instructions or statements that execute on the processor 202 to carry out the functions as further described below. In another embodiment, data warehouse instructions 232 and a random seed generator 234 may be implemented in hardware via semiconductor devices, chips, logical gates, circuits, circuit cards, and/or other physical hardware devices in lieu of, or in addition to, a processor-based system. In an embodiment, data warehouse instructions 232 and a random seed generator 234 may include data in addition to instructions or statements.

The host server 110 may include a bus interface unit 209 to handle communications among the processor 202, the memory 204, a display system 224, and the I/O bus interface unit 210. The I/O bus interface unit 210 may be coupled with the I/O bus 208 for transferring data to and from the various I/O units. The I/O bus interface unit 210 communicates with multiple I/O interface units 212, 214, 216, and 218, which are also known as I/O processors (IOPs) or I/O adapters (IOAs), through the I/O bus 208. The display system 224 may include a display controller, a display memory, or both. The display controller may provide video, audio, or both types of data to a display device 226. The display memory may be a dedicated memory for buffering video data. The display system 224 may be coupled with a display device 226, such as a standalone display screen, computer monitor, television, or a tablet or handheld device display. In an embodiment, the display device 226 may include one or more speakers for rendering audio. Alternatively, one or more speakers for rendering audio may be coupled with an I/O interface unit. In alternate embodiments, one or more of the functions provided by the display system 224 may be on board an integrated circuit that also includes the processor 202. In addition, one or more of the functions provided by the bus interface unit 209 may be onboard an integrated circuit that also includes the processor 202.

The I/O interface units support communication with a variety of storage and I/O devices. For example, the terminal interface unit 212 supports the attachment of one or more user I/O devices 220, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 220 and the host server 110, and may receive output data via the user output devices. For example, a user interface may be presented via the user I/O device 220, such as displayed on a display device, played via a speaker, or printed via a printer.

The storage interface 214 supports the attachment of one or more disk drives or direct access storage devices 222 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 222 may be implemented via any type of secondary storage device. The contents of the memory 204, or any portion thereof, may be stored to and retrieved from the storage device 222 as needed. The I/O device interface 216 provides an interface to any of various other I/O devices or devices of other types, such as printers or fax machines. The network interface 218 provides one or more communication paths from the host server 110 to other digital devices and computer systems; these communication paths may include, e.g., one or more networks 115.

Although the host server 110 shown in FIG. 2 illustrates a particular bus structure providing a direct communication path among the processors 202, the memory 204, the bus interface 209, the display system 224, and the I/O bus interface unit 210, in alternative embodiments the host server 110 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 210 and the I/O bus 208 are shown as single respective units, the host server 110 may, in fact, contain multiple I/O bus interface units 210 and/or multiple I/O buses 208. While multiple I/O interface units are shown, which separate the I/O bus 208 from various communications paths running to the various I/O devices, in other embodiments, some or all of the I/O devices are connected directly to one or more system I/O buses.

In various embodiments, the host server 110 is a multi-user mainframe computer system, a single-user system, or a server computer or similar device that has little or no direct user interface, but receives requests from other computer systems (clients). In other embodiments, the host server 110 may be implemented as a desktop computer, portable computer, laptop or notebook computer, tablet computer, pocket computer, telephone, smart phone, or any other suitable type of electronic device.

Figure 3:
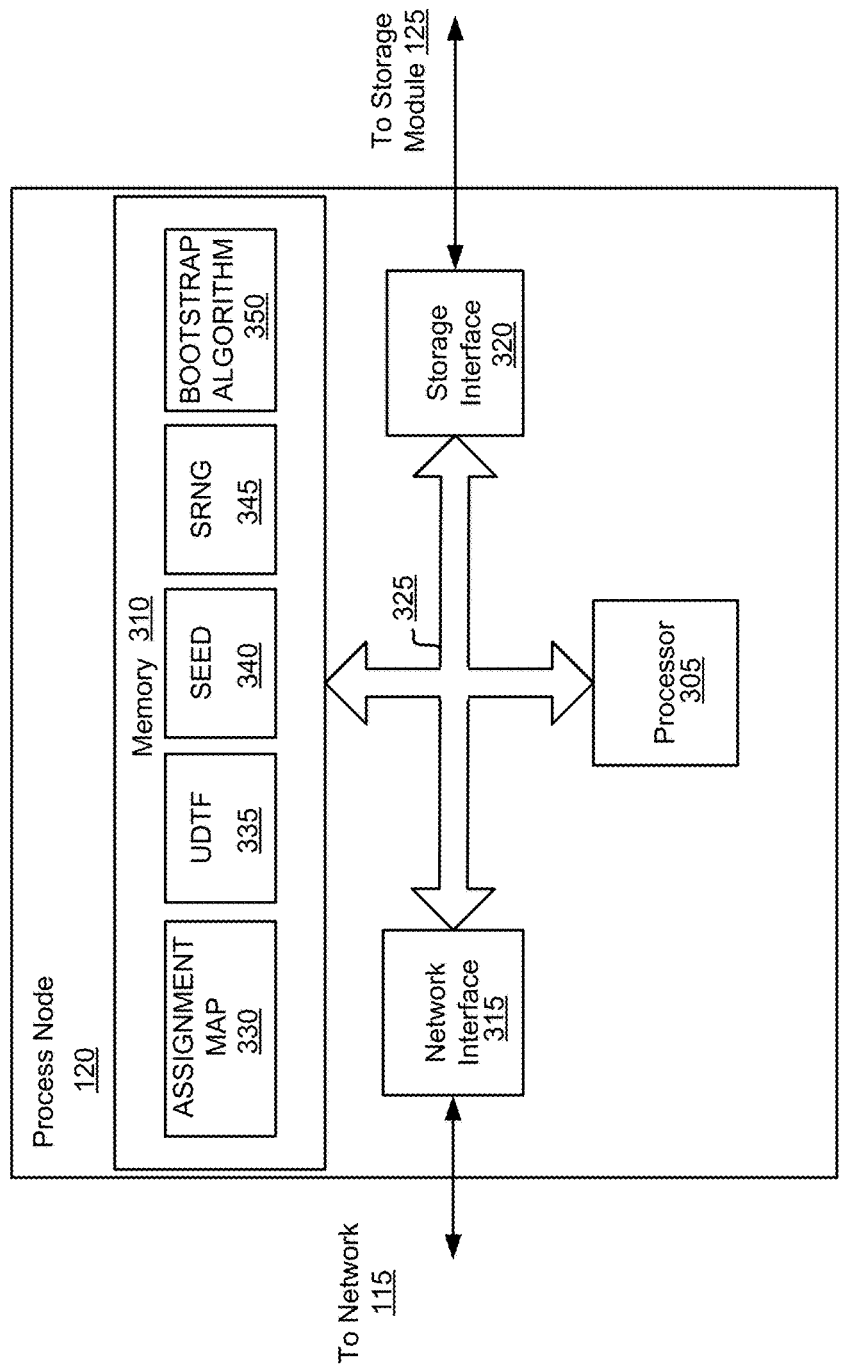
FIG. 3 is a schematic block diagram illustrating various embodiments of a process node of FIG. 1.

FIG. 3 is a schematic block diagram illustrating various embodiments of a process node 120. The process node 120 is one example context in which embodiments may be implemented. The mechanisms and apparatus of the various embodiments disclosed herein apply equally to any appropriate computing system. The major components of the process node 120 include one or more processors 305, a memory 310, a network interface 315, and a storage interface 320 all of which are communicatively coupled, directly or indirectly, for inter-component communication via a bus 325.

The process node 120 may contain one or more general-purpose programmable central processing units (CPUs) herein generically referred to as the processor 305. In an embodiment, the process node 120 may contain multiple processors; however, in another embodiment, the process node 120 may alternatively be a single CPU system. Each processor 305 executes instructions stored in the memory 310 and may include one or more levels of on-board cache.

In an embodiment, the memory 310 may include a random-access semiconductor memory, storage device, or storage medium (either volatile or non-volatile) for storing or encoding data and programs. In another embodiment, the memory 310 represents the entire virtual memory of the process node 120, and may also include the virtual memory of other computer systems coupled to the process node 120 or connected via a network 115. The memory 310 is conceptually a single monolithic entity, but in other embodiments the memory 310 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 204 may store all or a portion of the following: an assignment map 330, user defined table functions (UDTF) 335, a random seed 340, seed random number generator (SRNG) 345, and a bootstrap aggregating algorithm 350. These programs and data structures are illustrated as being included within the memory 310 in the process node 120, however, in other embodiments, some or all of them may be on different computer systems and may be accessed remotely, e.g., via a network 115. The process node 120 may use virtual addressing mechanisms that allow the programs of the process node 120 to behave as if they only have access to a large, single storage entity instead of access to multiple, smaller storage entities. Thus, while the assignment map 330, the UDTFs 335, the random seed 340, the seed random number generator 345, and bootstrap aggregating algorithm 350 are illustrated as being included within the memory 310, it may not necessarily all be completely contained in the same storage device at the same time.

In an embodiment, the assignment map 330, the UDTFs 335, the random seed 340, the seed random number generator 345, and bootstrap aggregating algorithm 350 may include instructions or statements that execute on the processor 305 or instructions or statements that are interpreted by instructions or statements that execute on the processor 305 to carry out the functions as further described below. In another embodiment, the assignment map 330, the UDTFs 335, the random seed 340, the seed random number generator 345, and bootstrap aggregating algorithm 350 may be implemented in hardware via semiconductor devices, chips, logical gates, circuits, circuit cards, and/or other physical hardware devices in lieu of, or in addition to, a processor-based system. In an embodiment, the assignment map 330, the UDTFs 335, the random seed 340, the seed random number generator 345, and bootstrap aggregating algorithm 350 may include data in addition to instructions or statements.

The storage interface 320 supports the attachment of one or more storage drives or direct access storage devices, such as storage module 125 (FIG. 1) (which are typically rotating magnetic disk drive storage devices, although they could alternatively be other storage devices, including arrays of disk drives configured to appear as a single large storage device to a host computer, or solid-state drives, such as flash memory). In another embodiment, the storage module 125 may be implemented via any type of secondary storage device. The contents of the memory 310, or any portion thereof, may be stored to and retrieved from the storage module 125 as needed. The I/O device interface 216 provides an interface to any of various other I/O devices or devices of other types, such as printers or fax machines. The network interface 315 provides one or more communication paths from the process node 120 to other digital devices and computer systems; these communication paths may include, e.g., one or more networks 115.

FIG. 2 and FIG. 3 are intended to depict the representative major components of the host server 110 and process node 120, respectively, according to various embodiments. Individual components, however, may have greater complexity than represented in FIG. 2 and FIG. 3 components other than or in addition to those shown in FIG. 2 and FIG. 3 may be present, and the number, type, and configuration of such components may vary. Several particular examples of additional complexity or additional variations are disclosed herein; these are by way of example only and are not necessarily the only such variations. The various program components illustrated in FIG. 2 and FIG. 3 may be implemented, in various embodiments, in a number of different manners, including using various computer applications, routines, components, programs, objects, modules, data structures, etc., which may be referred to herein as "software," "computer programs," or simply "programs."

Figure 4:
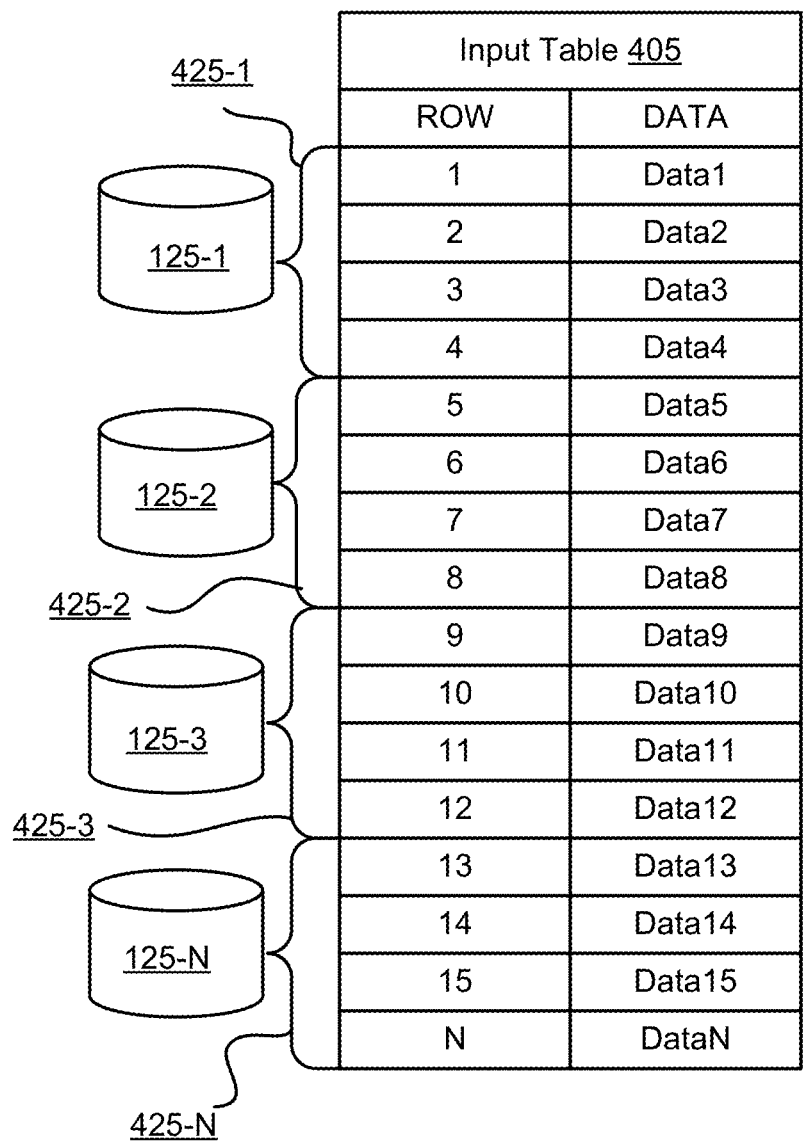
FIG. 4 illustrates an example of an initial dataset partitioned into data slices across a plurality of storage modules, according to various embodiments.

FIG. 4 illustrates an example of an initial dataset partitioned into data slices across the plurality of disks 125-1-125-N, according to various embodiments. In FIG. 4, the initial dataset may be input table 405. The input table 405 may include a plurality of rows (rows 1-N) of data entries (Data1-DataN) that make up the input table 405. When initially stored in the plurality of storage modules 125, the initial data table 405 may be partitioned into separate data slices 425-1-425-N. Data slices may be referred collectively herein as data slices 425. Each data slice 425 may be a virtual partition of storage on the storage modules 125 that belongs to a particular process node 120 of FIG. 1. In embodiments, the amount of data rows per data slice 425 may be partitioned to be equal in all data slices 425.

Figure 5:
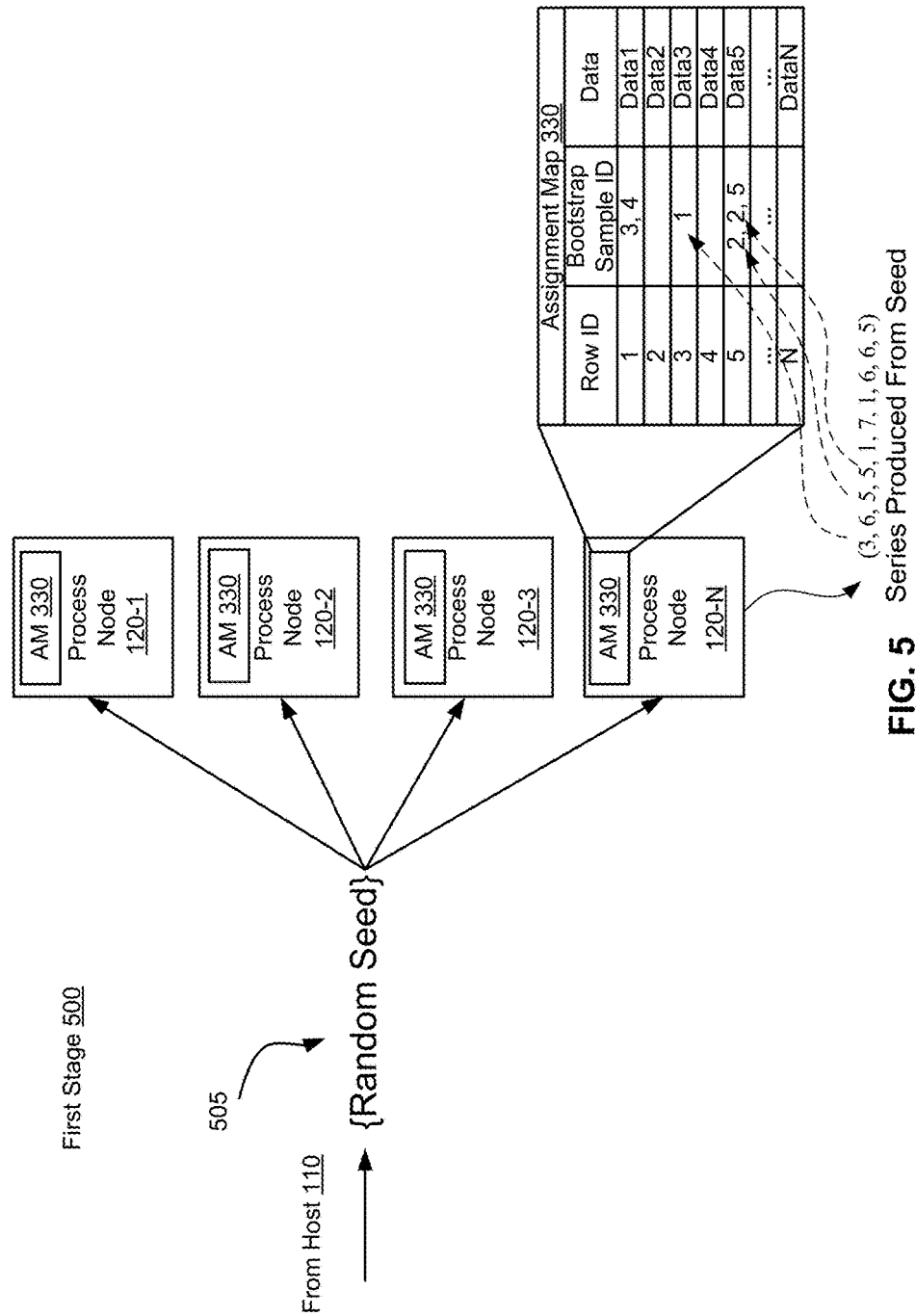
FIG. 5 illustrates a first stage of producing an assignment map when creating bootstrap samples of a dataset, according to various embodiments.

FIG. 5 illustrates a first stage 500 of producing an assignment map 330 when bootstrap aggregating a dataset, according to various embodiments. To create the assignment map 330, a random seed 505 may be generated by the random seed generator 234 of the host server 110. The random seed 505 may be a large integer. The random seed 505 may be sent from the host server 110 to all of the process nodes 120. This may be to ensure that each process node 120 generates an identical assignment map 330. Each process node 120 may produce with a seed random number generator a series 510 of integers from the random seed 505. Since each process node 120 receives the same random seed 505, each process node 120 may create the same series 510. The integer values of the series 510 may be from the range of one to total number of rows in the initial dataset. The number of integers in the random seed 340 may be a desired number of bootstrap samples multiplied by the size of each bootstrap sample. From the series 510, the process nodes 120 can create the assignment map 330 which will be identical across process nodes 120. By sending the random seed 505 to the process nodes 120 and having the process nodes 120 produce the assignment map 330 on their own may be less resource intensive for the data warehouse appliance 100 because no network operations are necessary as is the case when one assignment map 330 is created and sent to all of the process nodes 120.

The assignment map 330 may be created as follows. Each process node 120 may use the random series 510 to assign each row to particular bootstrap sample and place this information in the assignment map 330. The bootstrap aggregating algorithm 350 may be used to perform this task. The random integers within the random series 510 may represent a row in the initial dataset. As each row, defined by the random series 510, is being assigned to a bootstrap sample, a group of counters may be maintained in order to make sure that each bootstrap sample receives precisely the desired number of rows. In various embodiments, the position of the random integer in the random series 510 may determine which bootstrap sample the row defined by that random integer belongs. For instance, if each bootstrap sample has a size of one, the row defined by the first integer in the random series 510 may be assigned to the first bootstrap sample. The row defined by the second integer may go into the second bootstrap sample and so on. If the size of the bootstrap sample is two, the rows defined by the first and second integers may go in the first bootstrap sample and rows defined by a third and fourth integer of the random seed 340 may be assigned to the second bootstrap sample.

Each process node 120 may follow the same definition for creating the assignment map 330 using the following pseudo-code for the bootstrap aggregating algorithm 350.

```
k—number of subsets (bootstrap samples or referred to as buckets herein)
n—size of each subset
N—total number of rows in the dataset
AM—assignment map, initially empty
Series—random seed (the same series provided to each node)
for i in range [1,k]:
{
    do n times:
    {
        r ← generateRandomIntegerFromRange([1, N], series)
        Append i to AM at index r
    }
}
```

FIG. 5 illustrates an example assignment map 330 that may be created according to the algorithm. The dataset may have N rows. For example, purposes N=10, the number of bootstrap samples k=5, size of the bootstrap sample n=2. A random series 510 using a random sequence of integers [1,10] may be (3, 6, 5, 5, 1, 7, 1, 6, 6, 5). Since the first integer of the random seed 340 is 3, then row 3 may be assigned to a first bootstrap sample and assigned a bootstrap sample identifier of 1 since it is in the first bootstrap sample. The second integer is 6 in the random series 510. Since the bootstrap samples have a size of 2, the row 6 (not shown) may be assigned also to the first bootstrap sample and assigned a bootstrap sample identifier of 1 in the assignment map 340. Since 5 is the third and fourth integers, row 5 may be assigned both spots in the second bootstrap sample with two bootstrap sample identifiers of 2. The integer 5 is also in the tenth position on the random series 510 so row 5 may be assigned to the fifth bootstrap sample denoted with the bootstrap sample identifier of 5 in the assignment map 340. Furthermore, in the random series 510 the integer 1 is in the fifth and seventh positions. So, row 1 may be in the third and fourth bootstrap samples and assigned a bootstrap sample identifier of 3 and 4. Note that row 2 and row 4 are not in the random series 510 so they are not assigned to a bootstrap sample. Also illustrated is that a row may be assigned to multiple bootstrap samples and a row may be assigned to the same bootstrap sample multiple times.

The assignment map 330 may enable quick (constant time) look-up of every row. This is due to the assignment map 330 being a hash-map that maps row identifiers to lists of bootstrap sample identifiers. No storage module 125 operations to this point may be required because no data from the input table 405 (initial dataset) is used. The assignment map 330 is created in memory of the process node 120 and only the total number of rows in the input table 405 needs to be known.

Figure 6:
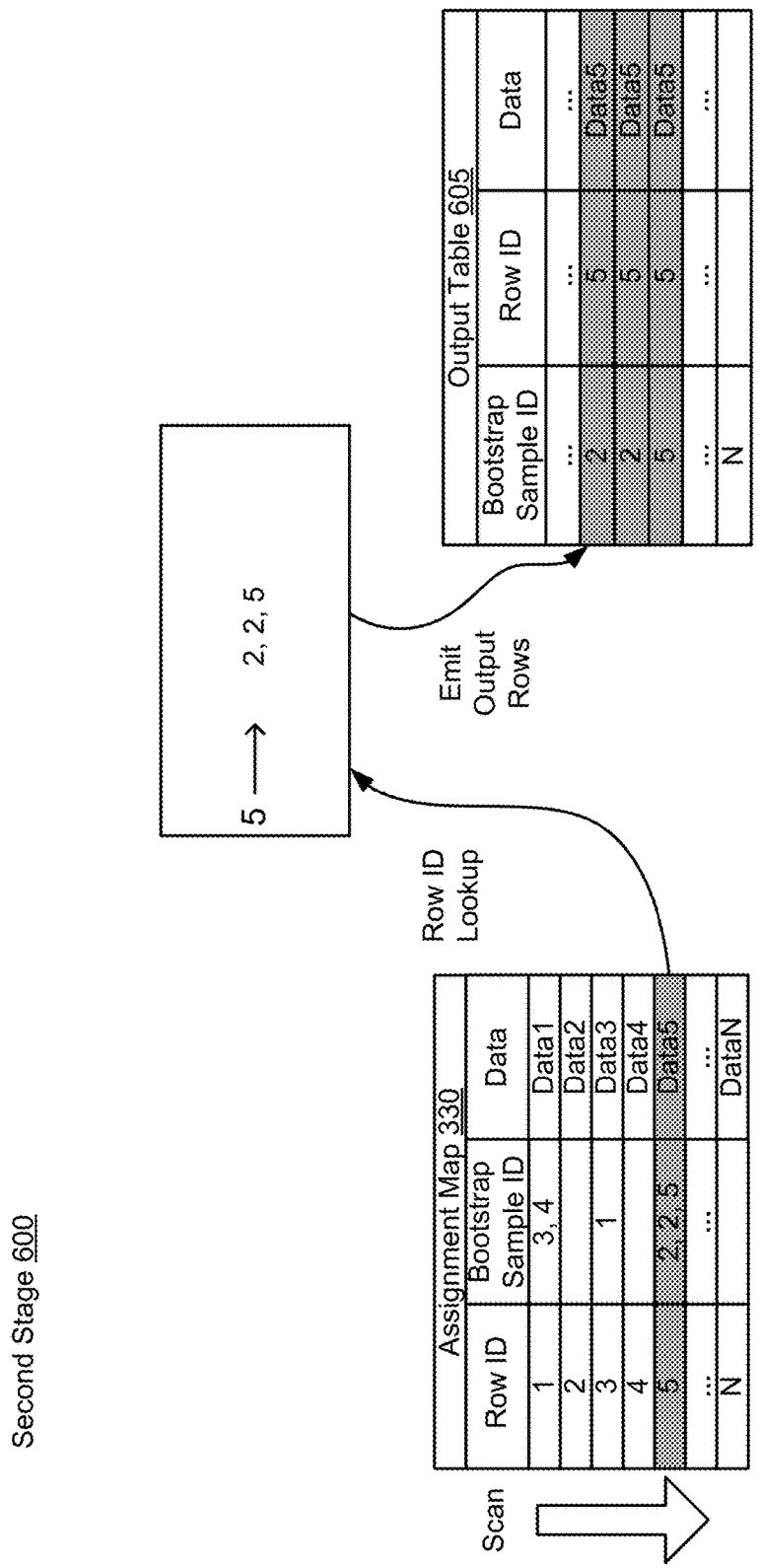
FIG. 6 illustrates a second stage of creating the bootstrap sample, according to various embodiments.

FIG. 6 illustrates a second stage 600 of creating the bootstrap sample output table 605, according to various embodiments. After the assignment map 330 is created, the process nodes 120 may perform a single data scan using the user-defined table function (UDTF) mechanism 335. Callback methods may be executed for each row of the assignment map 330. For a single row execution, a look-up in the assignment map 330 is performed to obtain the list of bootstrap sample numbers for the row in question. Creating an output table 605 based off of the bootstrap sample identifiers allows for a bootstrap sample to be assigned to a process node 120 so that the process node 120 can process the dataset rows identified by the bootstrap sample. Based on the list, a number of output rows may be emitted with the proper bootstrap sample identifier. For example, the UDTF 335 may lookup row identifier 5. Row identifier 5 may show that row 5 is assigned to bootstrap samples 2, 2, and 5. An output table 605 is created for each bootstrap sample identifier with output rows containing the bootstrap identifier and the row identifier assigned to it. In output table 605, the output rows for the row identifier 5 of the assignment map 330 may have two output rows with bootstrap sample identifier 2 and row identifier 5 and a third output row having a bootstrap sample identifier of 5 and a row identifier of 2.

Once the output table 605 is created, the output rows of the output table 605 and associated row data may be distributed to the data slices on the storage modules 125 based on the bootstrap sample identifier. Due to the distribution of the output table 605, all of the rows with the same bootstrap sample identifier are on the same data slice and may be processed by the same process node 120. This allows for a data analytics algorithm to process the bootstrap samples without the need of redistribution of the data rows. This approach may ensure parallel processing of data by creating a predictive model per data slice.

Figure 7:
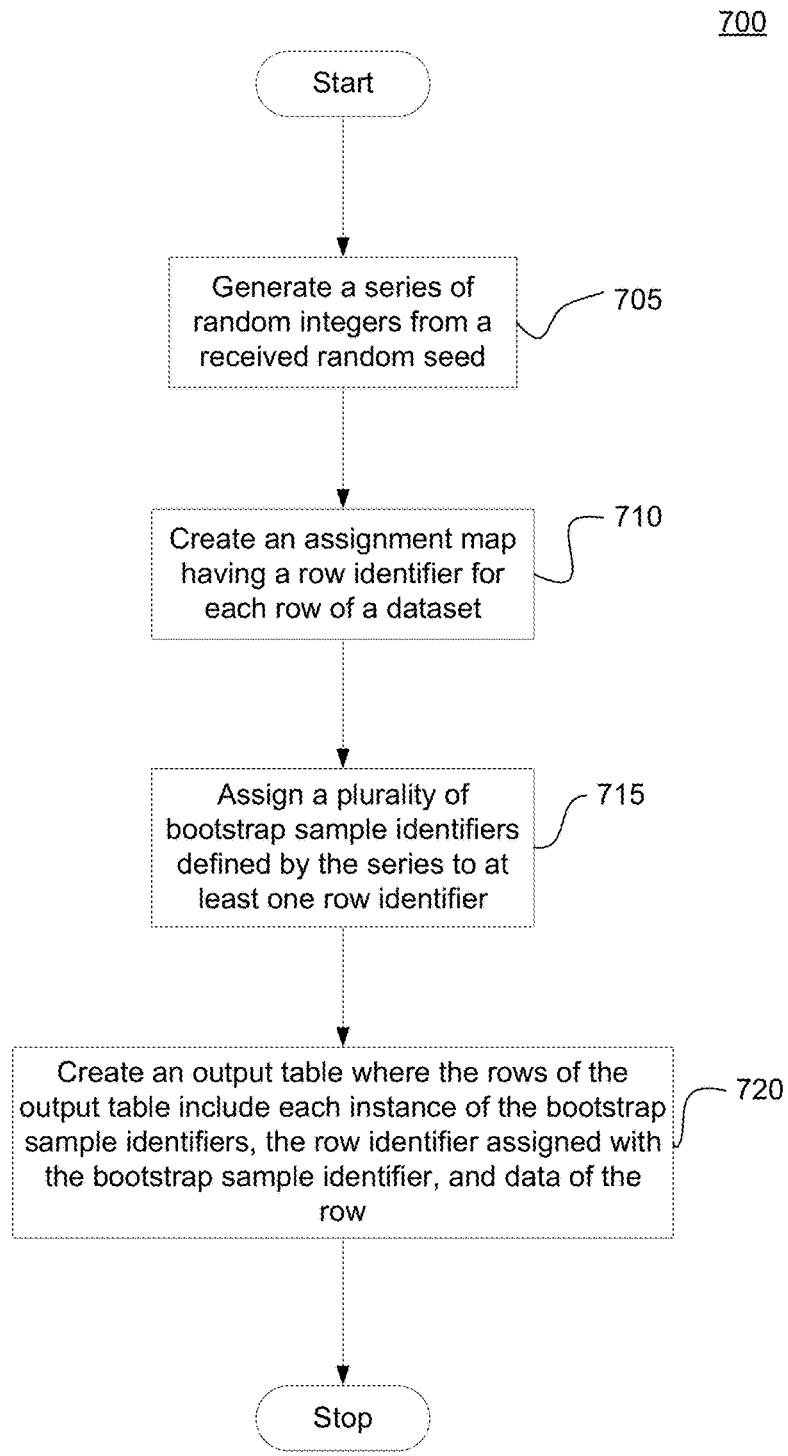
FIG. 7 illustrates a flowchart of a method of creating bootstrap samples from a dataset, according to various embodiments.

FIG. 7 illustrates a flowchart of a method 700 of creating bootstrap samples from a dataset, according to various embodiments. In operation 705, a process node may receive a random seed from a host server. The process node may produce a series of random integers from the random seed with a seed random number generator. The random integers may have values that range from one to the number of rows in the dataset. The number of random integers may be the product of the number of bootstrap samples and the size of each bootstrap sample. The random seed may be sent from the host server to a plurality of process nodes. The series of random integers created from the random seed may be identical across process nodes.

In operation 710, the process node may create an assignment map. The assignment map may be a table of row identifiers for each row of the dataset. In operation 715, the process node may assign a plurality of bootstrap sample identifiers defined by the series of random integers to at least one row identifier. The bootstrap sample identifier and the row identifier to which the bootstrap sample identifier is assigned, is determined by the position of a random integer in the series of random integers and the value of the random integer, respectively. The size of each bootstrap sample may determine the number of bootstrap sample identifiers of the bootstrap sample.

In operation 720, an output table may be created from the assignment map. The rows of the output table include each instance of the bootstrap sample identifiers, its corresponding row identifier, and row data. The output table may be created by locating, with a user-defined table function of the process node, row identifiers in the assignment that have at least one bootstrap sample identifier assigned. The row identifiers with the bootstrap sample identifiers may be extracted with the process node. The bootstrap sample identifiers, the row identifiers of the rows, and the row data may be the output table. The output table may be distributed among the process nodes with respect to bootstrap sample identifier. The processing of the rows assigned to a bootstrap sample may be performed by one process node. These rows may be the data slice of the process node. This results with a set of bootstraps distributed for future use in classification, regression, or other data-mining tasks.

Referring back to FIG. 2 and FIG. 3, embodiments may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A process node for creating bootstrap samples from a dataset, wherein the process node is one of a plurality of process nodes in a data warehouse appliance, the process node comprising:

a processor; and a memory communicatively coupled to the processor, wherein the memory is encoded with instructions and wherein the instructions when executed by the processor include:

receive a random seed from a host server;

generate, with the process node, a series of random integers using the random seed, wherein the random seed is configured to cause each of the plurality of process nodes to generate the same series of random integers when received by each of the plurality of process nodes;

create, with the process node, an assignment map, the assignment map includes a row identifier for each row of the dataset;

assign, with the process node, a plurality of bootstrap sample identifiers defined by the series of random integers to at least one row identifier in the assignment map; and create, with the process node and based on the assignment map, an output table, each row of the output table includes an instance of a bootstrap sample identifier, the row identifier assigned with the instance of the bootstrap sample identifier, and data from the row of the data set associated with the row identifier.

2. The process node of claim 1, wherein the instructions when executed by the processor include:
   distribute the output table to one or more storage modules.

3. The process node of claim 1, wherein the instructions when executed by the processor include:
   locate, with a user-defined table function of the process node, row identifiers in the assignment that have at least one bootstrap sample identifier assigned; and
   extract, with the process node, entries in the assignment map that have at least one bootstrap sample identifier assigned, wherein the bootstrap sample identifiers, the row identifier of the entries, and data of the row identified form the output table.

4. The process node of claim 1, wherein values of each of the random integers are selected from a range between one and a value equal to the total number of rows in a dataset.

5. The process node of claim 1, wherein each of the plurality of bootstrap sample identifiers is corresponds to a position of a random integer in the series of random integers and the row identifier to which each bootstrap sample identifier is assigned is determined by the value of the corresponding random integer.

6. The process node of claim 1, wherein the number of random integers in the series is the product of the number of bootstrap samples and the size of each bootstrap sample.

7. A computer program product of creating bootstrap samples from a dataset, the computer program product comprising a non-transitory computer readable storage medium having program code embodied therewith, the program code executable by a computer system to:
   receive a random seed from a host server;
   generate, with a process node, a series of random integers using the random seed, wherein the random seed is configured to cause each of a plurality of process nodes to generate the same series of random integers when received by each of the plurality of process nodes;
   create, with the process node, an assignment map, the assignment map includes a row identifier for each row of the dataset;
   assign, with the process node, a plurality of bootstrap sample identifiers defined by the series of random integers to at least one row identifier in the assignment map; and
   create, with the process node and based on the assignment map, an output table, each row of the output table includes an instance of a bootstrap sample identifier, the row identifier assigned with the instance of the bootstrap sample identifier, and data from the row of the data set associated with the row identifier.

8. The computer program product of claim 7, wherein the program code when executed by the computer system further include:
   distribute the output table to one or more storage modules.

9. The computer program product of claim 7, wherein the program code when executed by the computer system further include:
   locate, with a user-defined table function of the process node, row identifiers in the assignment that have at least one bootstrap sample identifier assigned; and
   extract, with the process node, entries in the assignment map that have at least one bootstrap sample identifier assigned, wherein the bootstrap sample identifiers, the row identifier of the entries, and data of the row identified form the output table.

10. The computer program product of claim 7, wherein the random integers have a value of one to the total number of rows in a dataset.

11. The computer program product of claim 7, wherein the bootstrap sample identifier is determined by the position of a random integer in the series of random integers and the row identifier to which the bootstrap sample identifier is assigned is determined by the value of the random integer.

12. The computer program product of claim 7, wherein the number of random integers in the series is the product of the number of bootstrap samples and the size of each bootstrap sample.

13. A system for creating bootstrap samples from a dataset, the system comprising:
   a host server;
   a plurality of process nodes communicatively coupled to the host server; and
   a plurality of storage modules, each of the plurality of process nodes in communication with at least one of the plurality of storage modules, wherein each of the plurality of process nodes is configured to perform a method, the method comprising:
   receiving a random seed from the host server;
   generating a series of random integers using the random seed, wherein the random seed is configured to cause each of the plurality of process nodes to generate the same series of random integers when received by each of the plurality of process nodes;
   creating an assignment map, the assignment map includes a row identifier for each row of the dataset;
   assigning, in the assignment map, a plurality of bootstrap sample identifiers defined by the series of random integers to at least one row identifier in the assignment map; and
   creating, based on the assignment map, an output table, each row of the output table includes an instance of a bootstrap sample identifier, the row identifier assigned with the instance of the bootstrap sample identifier, and data from the row of the dataset associated with the row identifier.

14. The system of claim 13, wherein the method further comprises:
   distributing the output table to one or more of the plurality of storage modules.

15. The system of claim 13, wherein values of each of the random integers are selected from a range between one and a value equal to the total number of rows in a dataset.

16. The system of claim 13, wherein each of the plurality of bootstrap sample identifiers corresponds to a position of a random integer in the series of random integers and the row identifier to which each bootstrap sample identifier is assigned is determined by the value of the corresponding random integer.

17. The system of claim 13, wherein the number of random integers in the series is the product of the number of bootstrap samples and the size of each bootstrap sample.

* * * * *